INVENTORS
JOHN T. LISLE
JOHN B. KLAMFOTH
BY
ATTORNEY

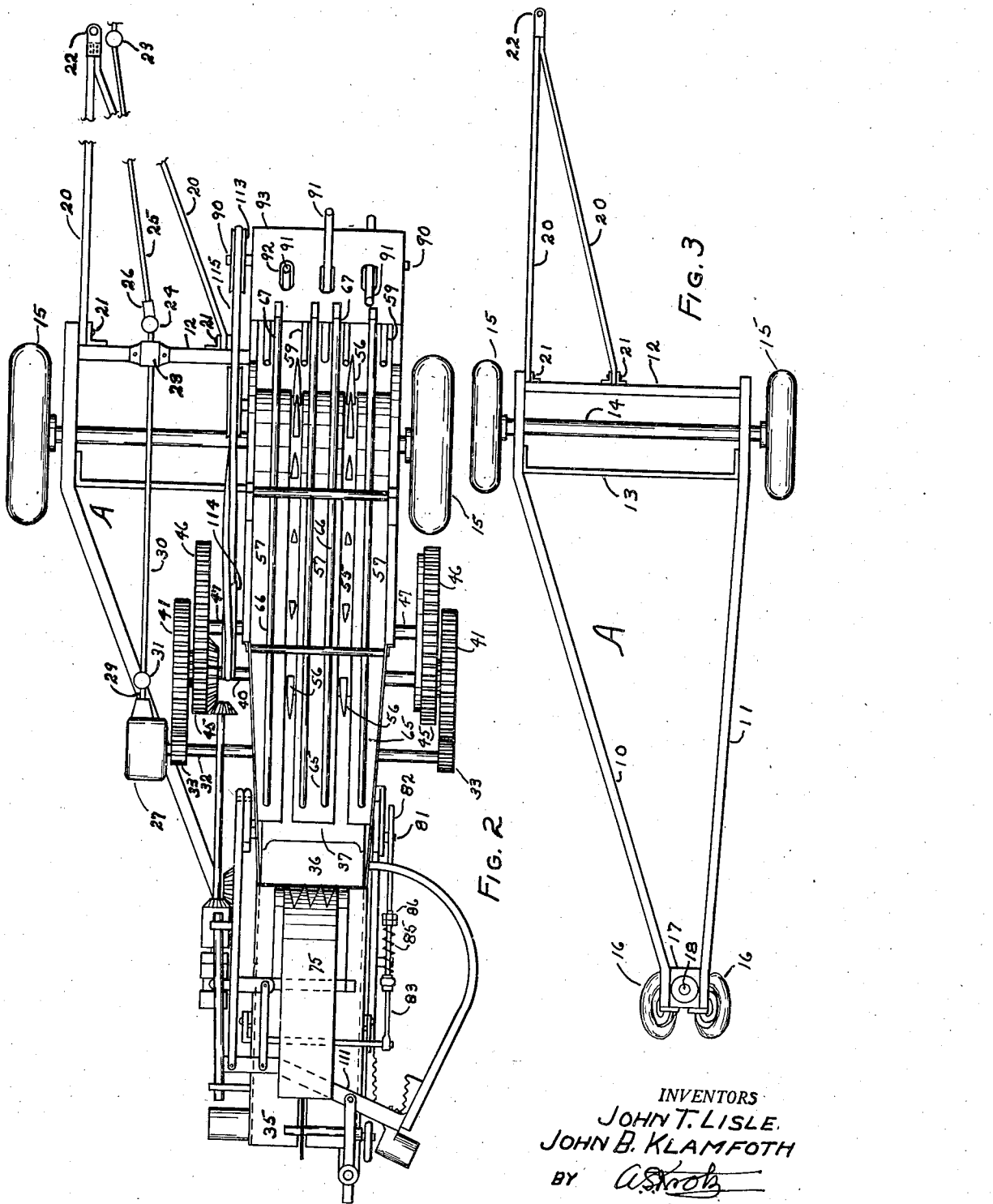

Patented Mar. 11, 1947

2,417,309

UNITED STATES PATENT OFFICE 2,417,309

HAY BALER

John T. Lisle and John B. Klamfoth, Lithopolis, Ohio

Application April 19, 1944, Serial No. 532,006

6 Claims. (Cl. 100—20)

The present invention relates to a hay or straw baler generally to be pulled and powered by a tractor and being adapted to pick up the hay from a windrow and bale and deliver it in predetermined sized bales to the ground.

An object of the present invention is to provide a baler which may also be used for stationary baling.

Another object of the present invention is to provide means whereby the bale is automatically bound, preferably by means of spaced wires.

A further object of our invention is to provide oscillating means for moving the hay in distinct and separated quantities and to the baler throat at intervals and pack these quantities in the throat by means of an independently operated head so that each quantity of hay delivered by the oscillating means forms a separate flat pad of the material in the bales.

Still further objects of the present invention are to provide novel pick up means for use when the baler is tractor pulled and provide a receiver for the accumulation of hay between strokes of the oscillator when pulled by a tractor or when the hay is supplied manually.

An important object of the present invention is to provide a device of the character which is simple, light, easily operated, efficient and can be manufactured at low cost.

To these and other useful ends our invention consists of parts, assemblies of parts or their equivalents and the mode of operation as hereinafter described and claimed and shown in the accompanying drawings in which:

Fig. 2 is a top view of the device as shown in Fig. 1, including a fraction of the tractor hitch.

Fig. 3 is a top view of the chassis of our device.

Figure 1:
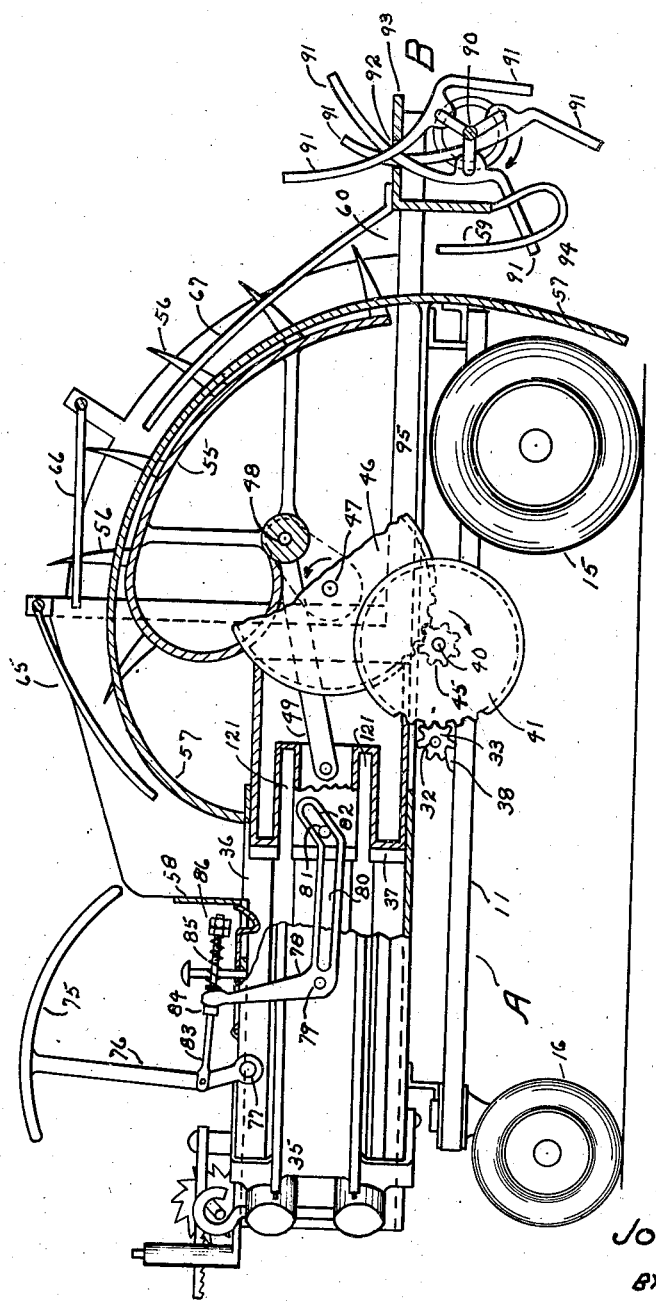
Fig. 1 is a side view of our device partially sectioned, and less the tractor hitch.

As thus illustrated, the chassis of the device is designated in its entirety by reference character A and consists preferably of side frame members 10 and 11 having suitable cross braces 12 and 13 and a front axle 14 on which is rotatably mounted preferably rubber tired ground wheels 15—15. The rear end of the device is carried preferably by two ground wheels 16—16, through a bracket 17 and a caster axle 18, the ground-wheels being preferably positioned at an angle so that they ride on the ground in close proximity.

We provide hitch bars 20—20 which are preferably pivoted to the frame as at 21—21, their front ends being connected together and having means as at 22 for a connection to the drawbar of a tractor.

Our device is adapted to be operated by a tractor having a power take-off which is operatively connected to a universal joint 23 which is connected to another universal joint 24 by means of a shaft 25, and a splined joint 26. We provide a transmission 27 having an operating connection to universal joint 24 by means of shafts 29 and 30 and universal joint 31. The forward end of shaft 30 is rotatably mounted on transverse bar 12 by means of a bearing 28. A shaft 32 is rotatably mounted on frame A and extends into the transmission housing 27, the end extending into the housing having secured thereto a bevel gear (not shown) which meshes a bevel pinion (not shown) which is secured to the inner end of shaft 29.

Thus it will be seen that shaft 32 will be driven by the power takeoff shaft on the tractor.

We provide the usual compression chamber 35 at the rear end of the device. This chamber is rectangular in cross section, the top of which is cut away as at 36 (see Figure 1) forming a well for the reception of the hay when the piston 37 is in its foremost position. Guideways to this well and the means for forcing the hay therein will be hereinafter described. Shaft 32 is rotatably mounted on a bearing block 38 which is secured to member 11. On opposite ends of this shaft we mount pinions 33—33.

We rotatably mount a shaft 40 on the device in any suitable manner and secure gears 41—41 to this shaft which mesh pinions 33. Shaft 40 is provided with pinions 45—45 which mesh gears 46—46. Gears 46 are mounted on a crank shaft 47 which is rotatably mounted on the device in any suitable manner and has a crank 48 which is driven in the direction indicated by the curvilinear arrow in Figure 1. Crank 48 is operatively connected to piston 37 by means of a connecting rod 49, and thus the necessary reciprocating motion is imparted to piston 37 and when this piston is in its foremost position its rear end will register with the front end of opening 36 or be slightly forward of this opening.

Thus we have provided a number of gear reductions so as to cause the piston to operate continuously but at a reduced rate as is the custom in devices of the kind. We rigidly mount an oscillator 55 on the forward end of connecting rod 49 having a shape about as shown in Figure 1 and having on its upper curved surface a suitable number of spaced prongs 56. Guides or runways 57 are provided, being spaced apart far enough so prongs 56 are free to follow the oscillator without contact with these guideways. The rear end of the guideways contact the front of opening 36. We preferably provide a plate 58 at the rear of opening 36 so that members 57 and 58 form a slightly funnel-shaped inlet opening to member 36. These members cooperate with the piston and side and bottom members of member 35 to form what may be considered a well for the reception of the hay to be baled. We provide restraining arms 65, 66 and 67 for a purpose which will hereinafter appear. At the forward end of the device we provide means which in its entirety is designated by reference character B, for picking the hay from the ground and moving it upwardly between members 57 and strippers 59 and into a pocket 60. It will be seen by scrutinizing Figure 1 that when crank 46 swings forwardly and upwardly, prongs 56 will engage the hay which has accumulated in pocket 60 and as the crank completes its rearward stroke the prongs will carry the hay rearwardly under bars 65, 66 and 67, depositing the hay in the entrance of the well.

Pickup device B may be of any suitable well known design. The design shown comprises a multi-crank 90. On each crank we mount fingers 91, the lower ends being adapted to engage the hay on the ground and the upper ends extending through openings 92 in a plate 93; thus as the crank 90 is turned by shaft 47 by means of V pulleys 113 and 114 and twisted belt 115 in the direction indicated by the curvi-linear arrow, the lower ends of the fingers will move downwardly, rearwardly and upwardly toward the inlet opening 94, the opening provided by the lower front end of member 57 and spaced members 59 between which the lower end of the fingers are free to move.

When the device is manually supplied with hay it may be thrown under member B which will then pick it up and move it upwardly into opening 94. The foremost prongs 56 on member 55, it will be seen, operate to engage the hay when they are in their lowest position and move it upwardly through entranceway 94 and pocket 60.

There is a period of time when prongs 56 are in their rearmost position, particularly when the device is tractor pulled, when the hay will be moved continuously into inlet 94 and it will accumulate in pocket 60, which will be emptied at each stroke of member 55. Under some conditions when it is desired to operate the device standing, member B may be disconnected so it will not operate and members 67 may be removed so the hay may be thrown manually in rear of members 91 and on member 93 which forms a ledge on which the hay will rest momentarily.

One of the objects of the present design is to position the lower front end of member 57 close to the ground wheels 15 and close to the ground so as to assist the fingers in picking up the hay from the ground. It will be understood however, that any well known conventional pickup device may be used instead of member B. It will be noted that members B and 93 are supported on supplemental frame members 95 which are mounted preferably on the forward ends of members 11, 12, and 13.

One of the advantages of our device is the fact that the prongs 56 will at intervals move all of the hay from the entranceway 94 and pocket 60 while it is in a loose state and therefore in distinct quantities over opening 36 after which these separate quantities will be forced into the well by member 75 as will hereinafter appear and then pressed against the accumulating bale by piston 37. The result is that when the baling wires are cut, each pad of hay may be easily separated from the bundle because it is not tangled with the adjacent pad as in conventional balers.

Member 75 is mounted on the free end of member 76 which is pivoted to member 35 as at 77. We provide a bell crank 78 which is pivotally mounted to member 35 as at 79. The forward end of the bell crank has a slot as at 80 through which a pin 81, which is secured to the piston, oscillates. The forward end of slot 80 is turned upwardly as at 82. A bolt 83 is pivoted to member 76 as shown, having a collar 84. The upper end of bell crank 78 has an opening through which the forward end of bolt 83 freely extends.

We provide a spring 85 and lock nuts 86 whereby the foremost movement of pin 81 will cause member 75 to enter opening 36. Spring 85 provides means whereby member 75 may yieldingly press the hay into the well.

The rear end of our improved baler is to some extent similar to conventional balers, differing, however, in that we provide means to automatically tie the bundles together so that one man can operate the device.

Clearly many detail changes may be made without departing from the spirit and scope of the invention as recited in the appended claims.

Having thus shown and described our invention we claim:

1. A baling device of the character described; comprising a compression chamber, a feed-in well at the forward end of said chamber, a piston and a crank with a connecting rod therebetween adapted to impart a reciprocating motion to the piston, an oscillator rigidly secured to said connecting rod and having a curved upper surface with a number of generally upwardly extending prongs thereon, whereby an upward and rearward and downward motion is imparted to the prongs, thereby to pick up the hay at the forward end of the device and deposit it over the feed-in well, an arm having a packing head mounted on the free end thereof, and a cam having an operating connection to a moving part of the device and to the arm, forming means whereby during the extreme forward motion of the piston said packing head will act to move the hay into said feed-in well.

2. A device as recited in claim 1 including; a spring interposed between said packing head arm and cam, whereby the packing head may yieldingly move into said feed-in well.

3. A device as recited in claim 1 including; guards positioned over said toothed oscillator adapted to resist an upward movement of hay as it is engaged and moved by said forks.

4. A device as recited in claim 1 including; a receiving opening at the forward end of said device adapted to receive and hold the hay for contact with the oscillator and prongs when the oscillator is in its forward position.

5. A baling device of the character described; comprising a compression chamber, a feed-in well at the forward end of said chamber, a piston and a crank with means therebetween adapted to impart a reciprocating motion to the piston, a curved oscillator secured to said means, having spaced prongs on its upper surface whereby an upwardly and rearwardly and downwardly directed motion of the teeth is imparted to thereby pick up the hay at the forward end of the device and deposit it over said feed-in well, a packing head mounted on the free end of an arm, a projection on said piston and a cam having a connection to said packing head arm and positioned to contact said pin, forming means whereby the extreme forward motion of the piston will cause said packing head to move into the feed-in well.

6. A pick up baling device of the character described, comprising a frame having ground wheels rotatably mounted on opposite sides of the frame and near the front end thereof, wheel carrying means on the rear end of the frame, a rotating mechanism having means for picking hay from the ground and delivering it to an enlarged holding pocket when the device is moved forward, a rotating shaft having a crank and a packing piston connected thereto by means of a connecting rod, a receiving well adapted to receive hay when the piston is in its forward position, a hay moving means carried by said connecting rod adapted to receive the hay from said pocket and deliver it over said well, means for packing the hay in the well having an operating connection to said piston with a cam movement, whereby the hay will be packed in the well when the piston is in its forward position.

JOHN T. LISLE.
JOHN B. KLAMFOTH.

REFERENCES CITED

The following references are of record in the file of this patent:

UNITED STATES PATENTS

| Number | Name | Date |
|---|---|---|
| 2,236,628 | Nolt | Apr. 1, 1941 |
| 866,934 | Katz | Sept. 24, 1907 |
| 2,179,937 | Lamp | Nov. 14, 1939 |
| 575,660 | Nixon | Jan. 19, 1897 |
| 1,721,906 | Hardman | July 23, 1929 |
| 2,147,469 | Tallman | Feb. 14, 1939 |
| 638,531 | Wallace | Dec. 5, 1899 |